(12) United States Patent
Date et al.

(10) Patent No.: US 7,817,021 B2
(45) Date of Patent: Oct. 19, 2010

(54) DISPLAY DEVICE MOUNTED IN WORKING VEHICLE AND DISPLAY METHOD FOR THE DISPLAY DEVICE

(75) Inventors: Kazuaki Date, Hiratsuka (JP); Toshiro Kuwahara, Hiratsuka (JP)

(73) Assignee: Komatsu Ltd.

( * ) Notice: Subject to any disclaimer, the term of this patent is extended or adjusted under 35 U.S.C. 154(b) by 345 days.

(21) Appl. No.: 11/997,968

(22) PCT Filed: Jul. 20, 2006

(86) PCT No.: PCT/JP2006/314368
§ 371 (c)(1),
(2), (4) Date: Apr. 11, 2008

(87) PCT Pub. No.: WO2007/018021
PCT Pub. Date: Feb. 15, 2007

(65) Prior Publication Data
US 2009/0009308 A1    Jan. 8, 2009

(30) Foreign Application Priority Data
Aug. 5, 2005    (JP) .............................. 2005-228659

(51) Int. Cl.
*B60Q 1/00* (2006.01)
(52) U.S. Cl. ...................... 340/438; 340/439; 340/461; 340/500; 340/665; 340/691.2; 340/691.4; 340/901; 340/903; 340/933; 348/148; 701/45; 701/50
(58) Field of Classification Search ................. 340/438, 340/439, 461, 500, 665, 691.2, 691.4, 901, 340/903, 933; 348/148; 701/45, 50
See application file for complete search history.

(56) References Cited
U.S. PATENT DOCUMENTS
7,342,486 B2 * 3/2008 Tsukada et al. ............. 340/438
(Continued)

FOREIGN PATENT DOCUMENTS
JP    2002-201676    7/2002
(Continued)

OTHER PUBLICATIONS
Japanese and English translated PCT International Search Report for International Application No. PCT/JP2006/314368; Oct. 24, 2006, 2 pages.

*Primary Examiner*—Tai T Nguyen
(74) *Attorney, Agent, or Firm*—Fish & Richardson P.C.

(57) ABSTRACT

A display device is mounted in a working vehicle equipped with a camera that monitors areas around the working vehicle. The display device includes: a monitor screen; first display means for displaying information about the working vehicle; second display means for displaying an image captured by the camera; first switching means for switching displayed image information; malfunction detection means for detecting a malfunction occured in the working vehicle; warning display means for displaying warning information; operation detecting means for detecting whether the working vehicle is working; and second switching means for automatically switching the image information displayed to the image information input by the first display means, where each referenced display is on the monitor screen. Thus, even if a malfunction occurs in the working vehicle, an operator is made aware of the malfunction in the working vehicle without being hindered from undertaking work while checking the safety.

4 Claims, 5 Drawing Sheets

U.S. PATENT DOCUMENTS 7,505,843 B2 * 3/2009 Okada et al. .................. 701/96

FOREIGN PATENT DOCUMENTS

| | | |
|---|---|---|
| JP | 2002-275949 | 9/2002 |
| JP | 2004-346643 | 12/2004 |
| JP | 2005-138751 | 6/2005 |
| KR | 1998017284 A | 6/1998 |
| KR | 20-0181589 | 5/2000 |
| KR | 20050053328 A | 6/2005 |

* cited by examiner (a)

(b)

(a)

(b)

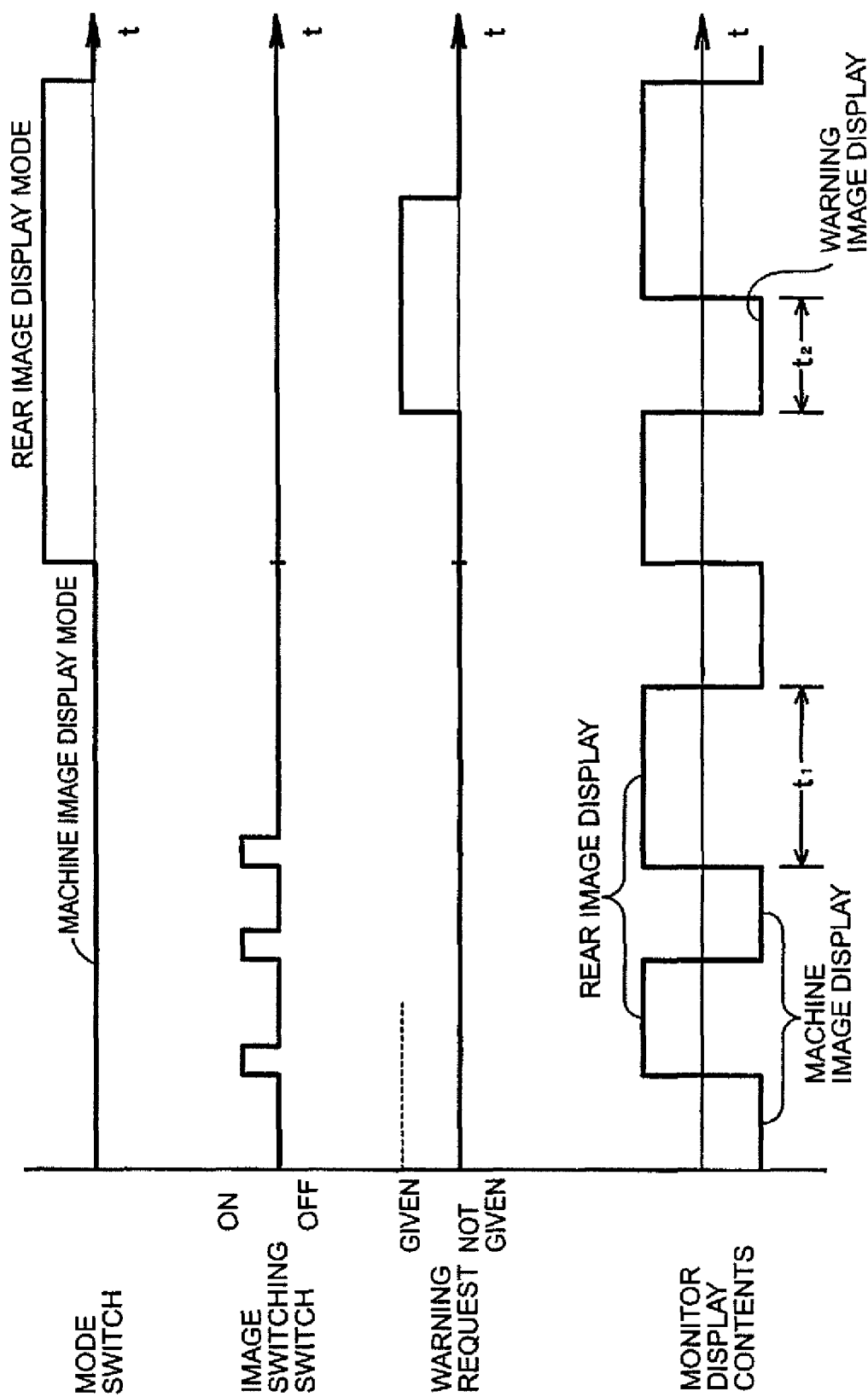

DISPLAY DEVICE MOUNTED IN WORKING VEHICLE AND DISPLAY METHOD FOR THE DISPLAY DEVICE

TECHNICAL FIELD

The present invention relates to display devices mounted in working vehicles, such as a hydraulic shovel, and display methods for the display devices. More particularly, the invention relates to a display apparatus mounted in a working vehicle equipped with a camera that monitors areas around the working vehicle, the display device being designed such that images captured by the camera are displayed on the monitor screen of the display device, thereby enabling an operator of the working vehicle to confirm the safety, and also relates to a display method for such a display device.

BACKGROUND ART

Working vehicles such as a hydraulic shovel mainly comprise: an undercarriage freely movable in a particular direction; an upper rotating body placed on the undercarriage so as to be rotatable; and a work machine (i.e., front attachment) attached to the upper rotating body so as to be freely moved upward or downward. At the front of the upper rotating body is an operator's cab. Disposed in the operator's cab are, for example, an operating seat, an operation lever for various operations performed by the operator, and a monitor screen for displaying information about the quantity of remaining fuel. Further, disposed at the rear of the upper rotating body is an engine hood covering an engine, etc. At the rear end of the upper rotating body is a counterweight that balances the weight of the working vehicle.

In such a working vehicle, since an operator sitting in an operator's cab has a wide field of view in front of the operator's cab, the operator can easily notice obstacles or the like existing in front of the working vehicle. However, as for areas on both sides of the operator's cab and the area behind it, the engine hood or counter weight obstructs the operator's view, making it difficult for the operator to visually check if there are any obstacles or the like.

In view of this drawback, a conventional working vehicle is equipped with a camera in the rear part of the upper rotating body and images captured by the camera are displayed on a monitor screen installed in the operator's cab. Thus, for example, when moving the working vehicle backward or rotating the upper rotating body, an operator can check the area of a dead angle by using a monitor screen, thus ensuring the safety of work.

Japanese Patent Application Laid-Open No. 2002-201676 (Patent Document 1), as an example of an invention that relates to a working vehicle equipped with such a camera, discloses a warning device for a working vehicle. The warning device described in Patent Document 1 is characterized by accommodating a camera and other devices (alarm, etc.) in a recess or groove of particular dimensions formed in a counter weight. This prevents the camera, etc. accommodated in the upper rotating body from being damaged as a result of striking against an obstacle during rearward motion of the working vehicle or rotation of the upper rotating body.

When undertaking, for example, an excavation using the working vehicle described above, an operator operates the working vehicle while accessing a variety of information on a monitor screen, such as the quantity of fuel remaining and engine cooling water temperature, thereby confirming that the working vehicle is functioning properly. On the other hand, for example, when moving backward or rotating the upper rotating body, image information (images) displayed on the monitor screen is switched by the operator from image information corresponding to the aforesaid variety of information to image information corresponding to an image captured by the camera.

This makes it possible for an operator to check on the monitor screen the area of a dead angle as viewed from an operator's cab and, at the same time, undertake the work safely. In such a working vehicle equipped with a camera, the operator can perform various operations while suitably switching an image displayed on the monitor screen, in accordance with the nature of each work.

In relation to such a situation, Japanese Patent Application Laid-Open No. 2004-346643 (Patent Document 2) discloses a monitor device in which operability of switching between images on the monitor screen has been improved. In the monitor device described in Patent Document 2, an operation lever for an operator is provided with an image switching switch used for switching images displayed on the monitor screen. In addition, a mode selection switch is provided for selecting a mode (i.e., machine image display mode) for displaying, on the monitor screen, information about the state of the working vehicle or a mode (i.e., rear image display mode) for displaying on the monitor screen an image captured by a camera.

According to Patent Document 2, providing the aforesaid two kinds of switch, namely an image selection switch and a mode selection switch, makes it possible for an operator to easily switch the monitor screen and cope with complicated work. To be specific, as shown in FIG. 5, in excavating or the like using the working vehicle, an operator selects the machine image display mode with a mode selection switch, thereby undertaking a certain task while checking the state of the working vehicle on the monitor screen. In addition, by depressing an image selection switch on the operation lever as necessity requires, the display on the monitor screen can be switched to an image (i.e., image of the rear) captured by a camera. Further, each time the image switching switch is depressed, the display on the monitor screen is switched to the alternative.

In addition, the monitor device disclosed in Patent Document 2 is designed such that when a fixed time t1 elapses after the display on the monitor screen has been switched to a rear image display as a result of depressing the image switching switch during the machine image display mode, the display on the monitor screen automatically returns to a machine image display.

On the other hand, when the rear image display mode is selected using the mode selection switch, an image of the rear is displayed on the monitor screen, thus enabling an operator to check on the monitor screen the safety of the work. If, for example, the engine cooling water temperature abnormally rises or the quantity of fuel remaining drops to a critical level during the rear image display mode, an operator must be informed of the malfunction in the working vehicle. In the monitor device disclosed in Patent Document 2, if a malfunction has occurred in the working vehicle during the foregoing rear image display mode, the monitor screen automatically switches to a warning image display in order to inform the operator of the malfunction. Further, when a fixed time t2 elapses after switching to the warning image display has taken place, this monitor device automatically returns to the rear image display again.

Patent Document 1: Japanese Patent Application Laid-Open No. 2002-201676

Patent Document 2: Japanese Patent Application Laid-Open No. 2004-346643

DISCLOSURE OF THE INVENTION

Problem to be Solved by the Invention

However, according to Patent Document 2, for example, if a malfunction occurs in the working vehicle, the monitor screen automatically switches from an image captured by the camera to the warning display image even without the operator's intention although the operator is still operating the working vehicle while checking on the monitor screen a rear image captured by the camera. This results in a situation where the operator operating the working vehicle suddenly cannot check the area of a dead angle as viewed by the operator. This hinders the operator from checking on the monitor screen safety during the operation of the working vehicle, which results in discontinuation of the work.

The present invention was made in view of the drawbacks discussed above. It is accordingly an object of the invention to provide a display device mounted in a working vehicle equipped with a camera, the display device being designed such that if a malfunction occurs in a working vehicle when an operator is operating the vehicle, the operator is made aware of the malfunction in the working vehicle without being hindered from undertaking work while checking safety.

Means for Solving the Problem

In order to achieve the foregoing object, there is provided a display device mounted in a working vehicle equipped with a camera that monitors areas around the working vehicle, as a basic configuration. The main feature of the display device is characterized by comprising: a monitor screen; first display means for displaying on the monitor screen information about work undertaken by the working vehicle or about running status of the working vehicle; second display means for displaying on the monitor screen an image captured by the camera; first switching means for switching image information displayed on the monitor screen between image information input by the first display means and image information input by the second display means; malfunction detection means for detecting a malfunction occurred in the working vehicle; warning display means for displaying warning information on a part of the monitor screen; operation detecting means for detecting whether the working vehicle is working or not; and second switching means for automatically switching the image information displayed on the monitor screen from image information input by the second display means to the image information input by the first display means, wherein, when image information input by the second display means is displayed on the monitor screen, if the malfunction detection means detects a malfunction in the working vehicle, the warning display means superposes and displays the warning information on the part of the monitor screen, and if the operation detecting means detects that the working vehicle has stopped working, the second switching means automatically switches the image information displayed on the monitor screen from the image information input by the second display means to the image information input by the first display means.

In the display device of the present invention, it is preferable that the warning display means comprises sound generating means for generating a warning sound.

According to another aspect of the invention, there is provided a display method for a display device mounted in a working vehicle equipped with a camera that monitors areas around the working vehicle, as a basic configuration. The main feature of the display method is characterized in that: when an image captured by the camera is displayed on a monitor screen provided for the display device, if a malfunction in the working vehicle is detected, warning information is superposed and displayed on the part of the monitor screen; and if it is detected that the working vehicle has stopped working, image information displayed on the monitor screen is automatically switched from image information corresponding to image captured by the camera to image information corresponding to a state of the working vehicle.

In the display method according to the invention, it is preferable that a warning sound be generated in synchronization with displaying of the warning information on the part of the monitor screen.

Effect of the Invention

The display device according to the invention has the foregoing configuration. Accordingly, if the malfunction detection means detects a malfunction of the working vehicle when an image captured by the camera is displayed on the monitor screen by the second display means, the warning display means can superpose and display warning information on a part of the monitor screen. Thus, superposing and displaying the warning information on a part of the monitor screen in response to the detection of the malfunction in the working vehicle makes an operator viewing an image captured by the camera aware of a malfunction that has occurred in the working vehicle. Since an image captured by the camera as a result of input from the second display means can be continuously displayed on the monitor screen as it is even if a malfunction occurs, an operator operating the working vehicle is not hindered from checking safety.

Further, in the display device of the present invention, when the operation detecting means detects that the working vehicle has stopped working after the superposing and displaying of the warning information on a part of the monitor screen, image information input by the second switch means and displayed on the monitor screen can be automatically switched to image information input by the first display means, specifically, image information corresponding to information about the state of the working vehicle. According to this invention, after the working vehicle has stopped working, the display on the monitor screen can be switched to image information about the state of the working vehicle. This securely ensures the safety of the working vehicle and enables an operator to ascertain the cause/causes of a malfunction of the working vehicle unhurriedly.

In the display device of the present invention, the warning display means may further include sound generating means that generates a warning sound. Thus, the warning display means is capable of generating a warning sound by the sound generating means as well as superposing and displaying the warning information on the part of the monitor screen. Accordingly, the warning display means also securely informs an operator of occurrence of a malfunction in the working vehicle by use of the warning sound.

In the display method according to the invention, if a malfunction in the working vehicle is detected when an image captured by the camera is displayed on the monitor screen of the display device, warning information can be superposed and displayed on the part of the monitor screen currently displaying the image captured by the camera. Viewing the monitor screen thus makes an operator aware of the malfunction in the working vehicle. Even if a malfunction is detected, the monitor screen can continuously display an image captured by the camera as a result of input from the second display means. This enables an operator to continue the operation of the working vehicle while checking the safety of the working vehicle.

When the working vehicle has stopped working after the superposition and display of the warning information on the part of the monitor screen, the image information displayed on the monitor screen can be automatically switched to image information about the state of the working vehicle from image information captured by the camera. Switching the displaying on the monitor screen in such a manner after the working vehicle has stopped working ensures the safety of the working vehicle and enables the operator to ascertain the cause/causes of a malfunction of the working vehicle unhurriedly.

In the display method of the present invention, a warning sound can be generated at the same time as the warning information is displayed on the part of the monitor screen. This securely informs an operator of the detection of a malfunction in the working vehicle.

BRIEF DESCRIPTION OF THE DRAWINGS

FIG. 5 is a chart of the timing of the switching switch of a conventional monitor device and the display contents of the monitor.

Figure 1:
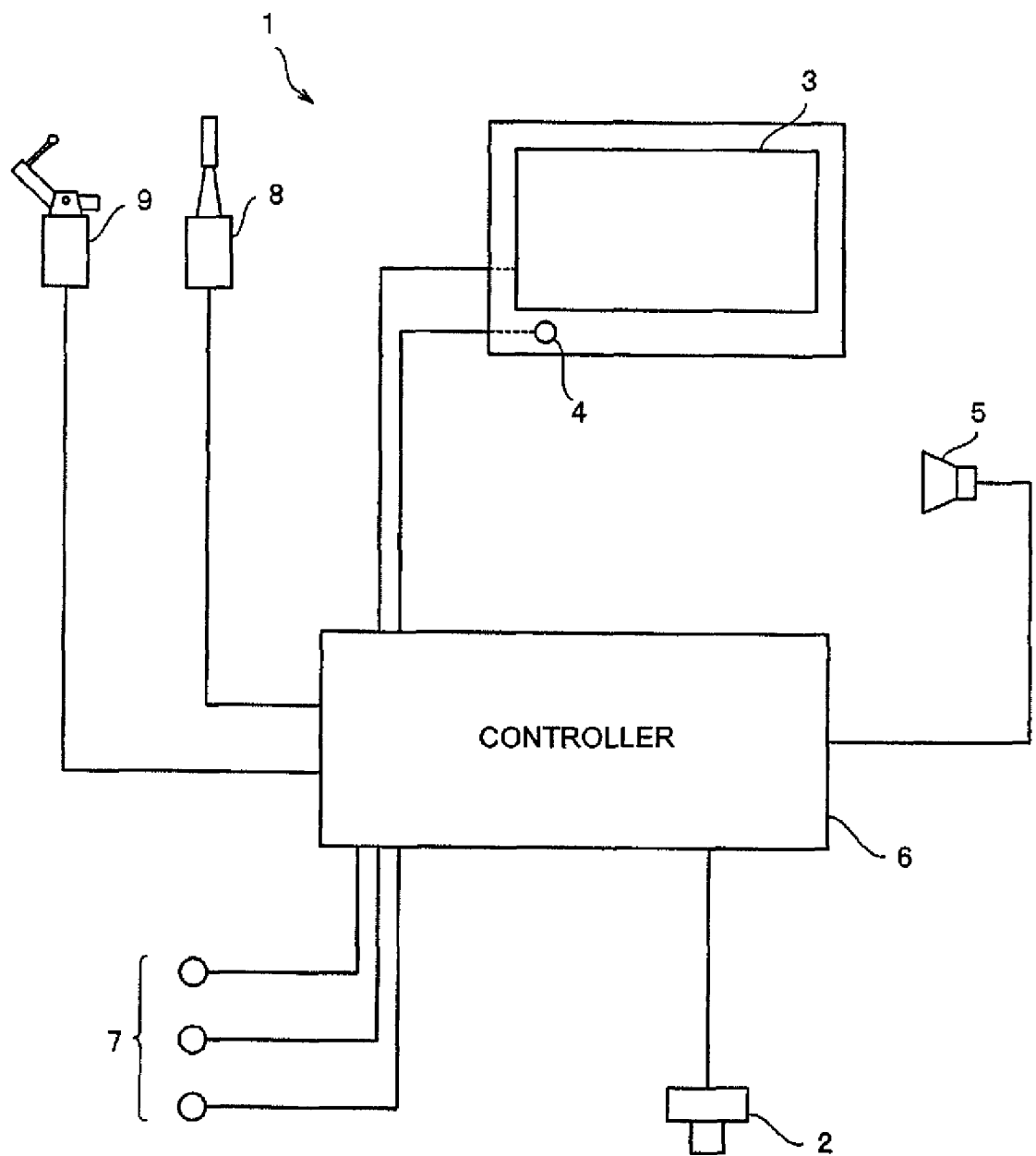
FIG. 1 is a block diagram of the configuration of a display device according to the invention.

EXPLANATION OF REFERENCE NUMERALS 1 display device
2 camera
3 monitor screen
4 first switching switch
5 warning buzzer
6 controller
7 sensor
8 work machine lever
9 running lever
10 function key
11 engine cooling water temperature meter
12 oil pressure indicator
13 fuel meter
14 clock
15 caution icon
16 icon indicating cause of malfunction
17 warning information (warning icon)

BEST MODE FOR CARRYING OUT THE INVENTION

Referring to the accompanying drawings, an embodiment of a display device according to the invention will now be described in detail. The description below exemplifies a display device mounted in a hydraulic shovel, which is one type of working vehicle. However, the display device according to the invention is not limited thereto but can also be mounted in any other working vehicle.

FIG. 1 is a block diagram showing the configuration of a display device according to the invention.

The display device 1 is mounted in a hydraulic shovel in which a camera 2 is installed. The camera 2 installed in the hydraulic shovel comprises a CCD (Charge Coupled Device) camera. This camera is installed so as to monitor the area of a dead angle as viewed by an operator sitting in the operator's cab of the hydraulic shovel, for example, to monitor the area behind the hydraulic shovel. However, the invention is not limited thereto but the place where the camera 2 is installed, or the number of cameras 2, can be determined as necessity requires.

As shown in FIG. 1, the display device 1 according to the invention includes: a monitor screen 3; a first switching switch 4 with which an operator can switch between image information (i.e., pictures) displayed on the monitor screen 3; a warning buzzer 5 for generating a warning sound; and a controller 6 connected to these members and the camera 2. Instead of the warning buzzer 5, sound generating means, which produces a sound warning, may be used.

Connected to the controller 6 are various sensors 7 attached to the hydraulic shovel, such as a fuel liquid level sensor, water temperature sensor, and hydraulic sensor. This controller 6 is connected to a work machine lever 8 and running lever 9 operated by an operator in the operator's cab, and the degree of operation of each of the levers 8 and 9 is input to the controller 6.

Further, the controller 6 includes the following processing means: first and second display means for displaying required image information on the monitor screen 3; malfunction detection means for detecting any malfunction of the hydraulic shovel based upon the detection result of each sensor 7; warning display means for displaying warning information on a part of the monitor screen 3; operation detecting means for detecting whether the hydraulic shovel is being operated or not; and second switching means by which image information shown on the monitor screen 3 is switched from image information input by the second display means to image information input by the first display means.

The monitor screen 3, first switching switch 4, and warning buzzer 5 shown in FIG. 1 are disposed in the operator's cab of the hydraulic shovel. The monitor screen 3 displays an image corresponding to information about the state of the hydraulic shovel, which is input by the first display means of the controller 6, and an image captured by the camera 2, which is input by the second display means.

For example, when image information is displayed on the monitor screen 3 by the first display means as shown in FIG. 3(a), the images of measuring instruments such as an engine cooling water temperature meter 11, oil pressure indicator 12, fuel meter 13, clock 14, and the like can be displayed on the monitor screen 3 to yield information about the state of the hydraulic shovel. Thus, by viewing the monitor screen 3, an operator can access a variety of information about the state of the hydraulic shovel, which includes the temperature of the engine cooling water, engine oil pressure, and quantity of remaining fuel, all of which are detected by the aforesaid sensors 7.

Figure 4:
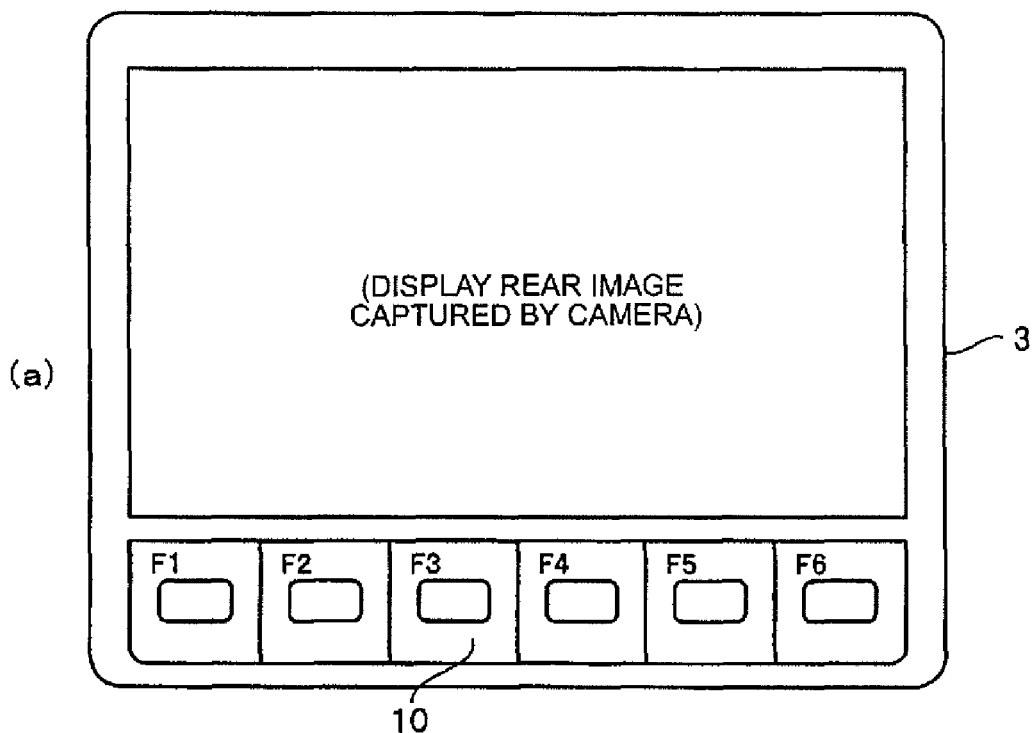
FIG. 4(a) is a schematic view of an example of a monitor screen displaying an image captured by a camera, which is input by second display means.
FIG. 4(b) is a schematic view of an example of the monitor screen on part of which warning information is superposed and displayed as a result of the detection of a malfunction in the hydraulic shovel.
Figure 4:
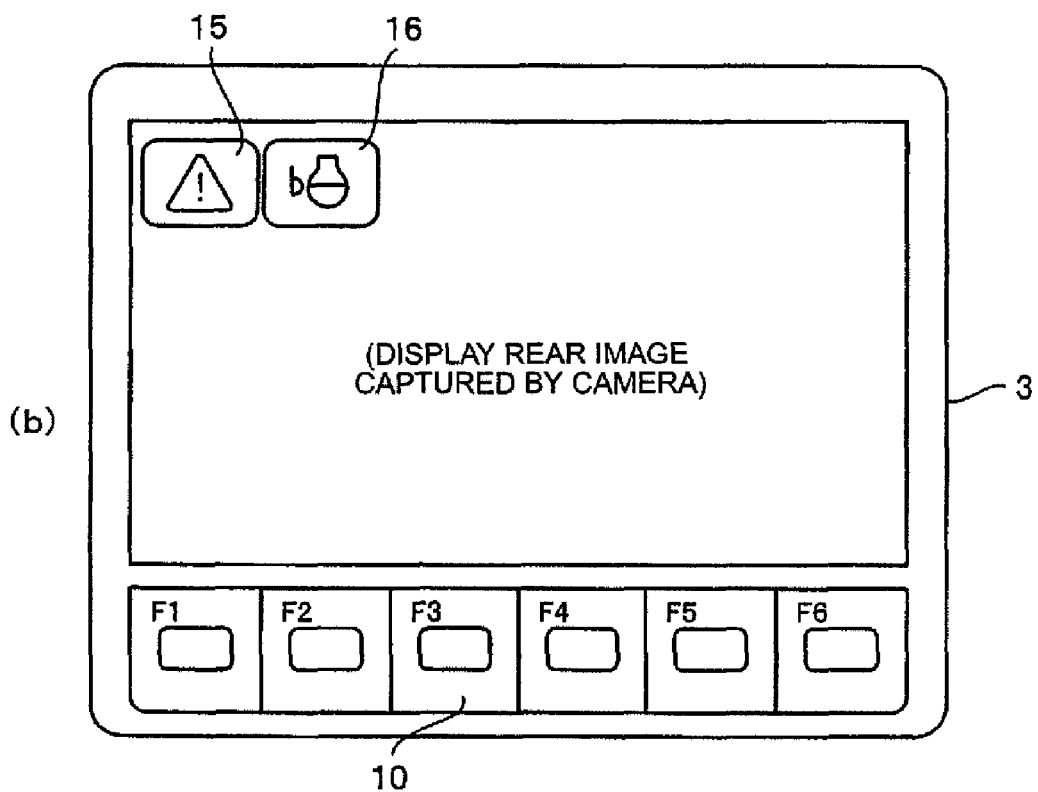

On the other hand, when image information is displayed on the monitor screen 3 by the second display means, an image captured by the camera 2 as shown in FIG. 4(a) can be displayed on the monitor screen 3 (in FIG. 4, images actually captured by the camera 2 are not shown). This enables an operator using the monitor screen 3 to check the safety of any area of dead angle as viewed from the operating seat.

Figure 3:
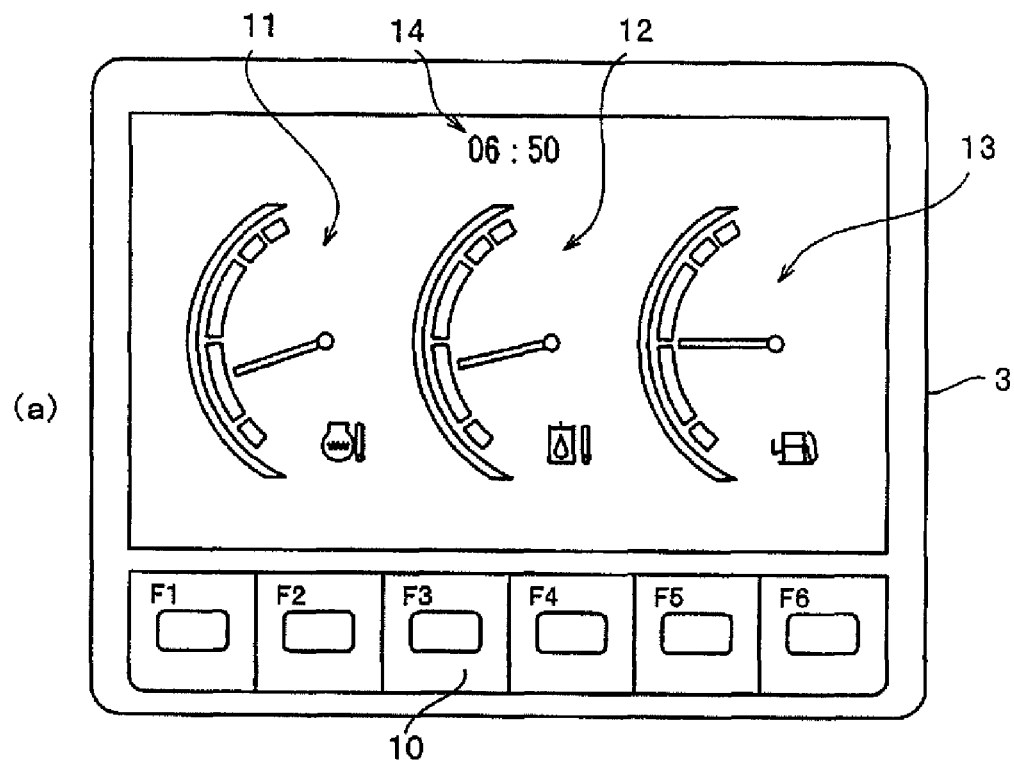
FIG. 3(a) is a schematic view of an example of a monitor screen displaying information about a hydraulic shovel, which is input by first display means.
FIG. 3(b) is a schematic view of an example of the monitor screen switched to image information, which is input by the first display means, after a malfunction has occurred in the hydraulic shovel.
Figure 3:
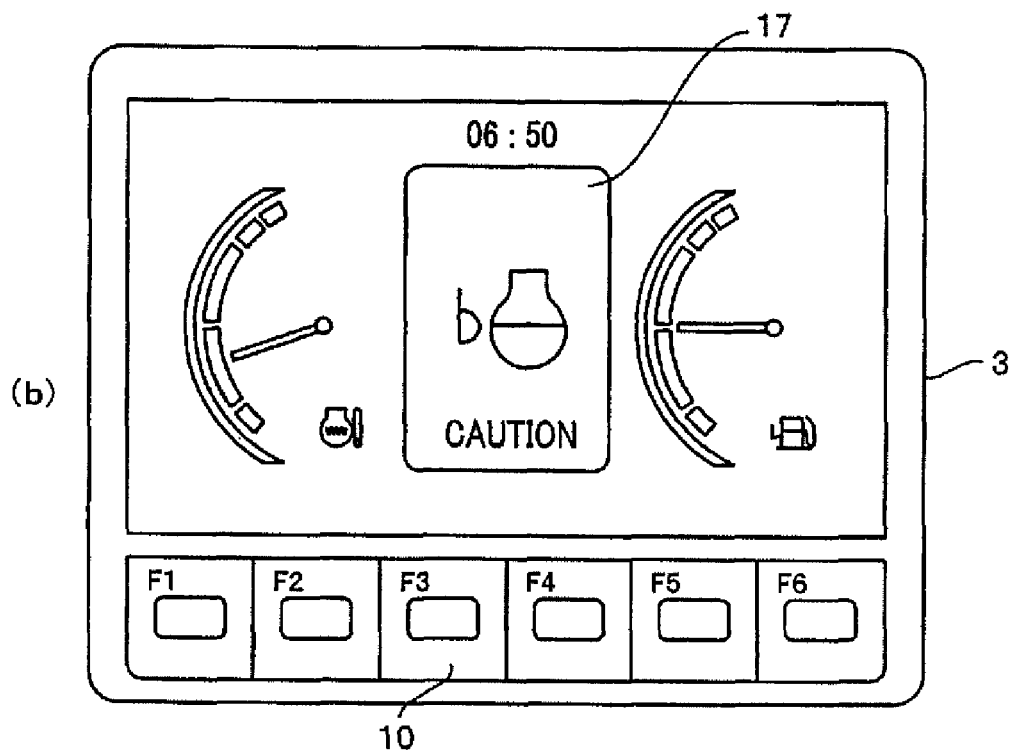

Further, monitor screen 3 may have a touch panel function. This makes it possible for an operator to perform required operations on the monitor screen 3, on the lower part of which, for example, function keys 10, etc. are displayed as shown in FIGS. 3 and 4. In a hydraulic shovel in which more than one camera is installed, the function keys 10 allow such operations as selecting between images captured by the cameras and displayed on the monitor screen.

It is preferable to dispose the first switching switch 4 near the monitor screen 3 and in a position where an operator can easily perform a switching operation. The first switching switch 4 may be composed of, for example, push button switches or the like. Pushing of the first switching switch 4 by an operator of the hydraulic shovel switches image information displayed on the monitor screen 3 between the image information (FIG. 3(*a*)) input by the first display means and the image information (FIG. 4(*a*)) input by the second display means, as necessity requires. Image information on the monitor screen 3 may be switched by operating the first switching switch 4 or automatically switched in response to the operation of the work machine lever 8 and/or running lever 9 of the hydraulic shovel.

Figure 2:
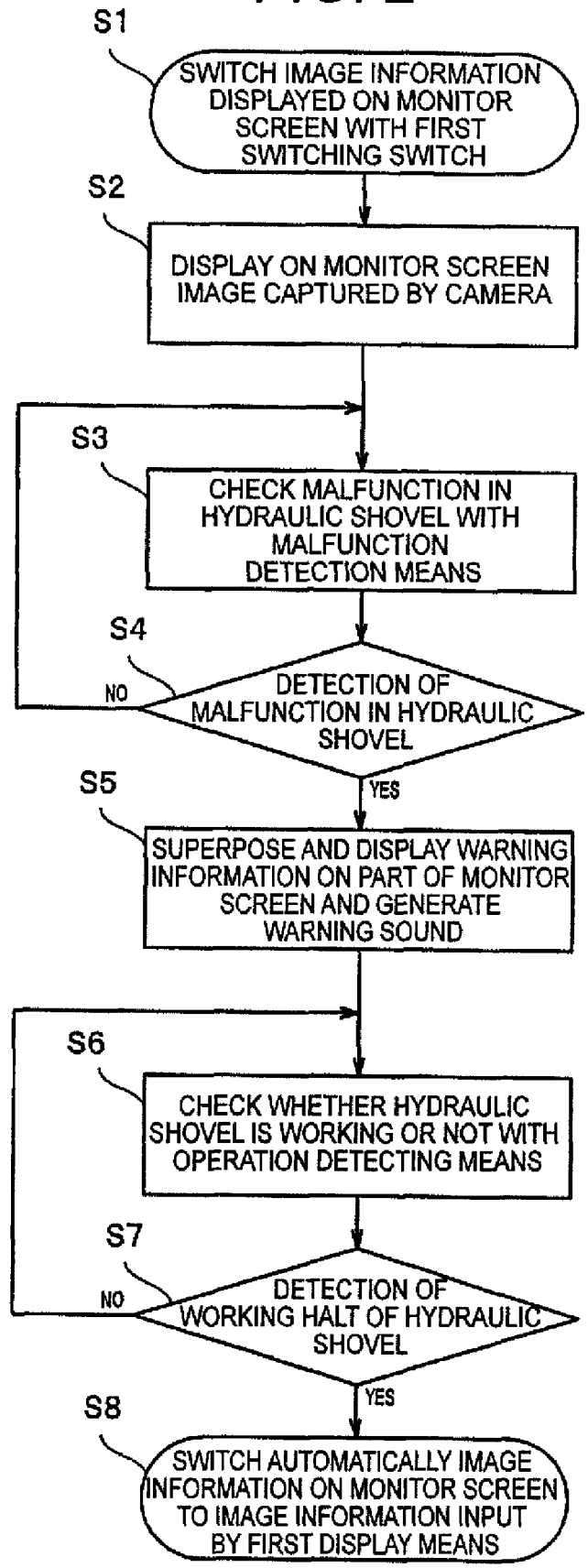
FIG. 2 is a flowchart illustrating an example of a display method for the display device according to the invention.

Next, a display method for a display device 1 that has the foregoing operation will be described with reference to the drawings. FIG. 2 is a flowchart illustrating the display method for the display device 1. In flowchart in FIG. 2, steps 1 to 8 are abbreviated as S1 to S8 respectively.

When the hydraulic shovel is in operation, for example, is excavating, the operator operates the first display means to display on the monitor screen 3 the images of measuring instruments, as shown in FIG. 3(*a*). Thus, by viewing the monitor screen 3 while operating the hydraulic shovel, an operator observes the state of the hydraulic shovel in order to check whether the hydraulic shovel is functioning properly. If a malfunction occurs in the hydraulic shovel, an operator becomes aware of the malfunction at an early stage.

When the hydraulic shovel is moving backward or the upper rotating body is rotated, for example, an operator switches the image information on the monitor screen 3 by depressing the first switching switch 4 in order to check the safety of the work (step 1). Thus, the image information displayed on the monitor screen 3 can be switched from image information (FIG. 3(*a*)) input by the first display means to image information input by the second display means, specifically, to an image (FIG. 4(*a*)) captured by the camera 2 (step 2). Accordingly, the operator visually checks both the area where the operator directly sees from the operating seat of the hydraulic shovel, and also the area of dead angle as viewed from the operating seat, through an image captured by the camera 2 and displayed on the monitor screen 3. Thus, the operator can check the safety of the hydraulic shovel.

When, in step 2, image information on the monitor screen 3 is switched to image information input by the second display means, the controller 6 subsequently checks whether the hydraulic shovel is functioning properly, using the malfunction detection means based upon the measurement determined by each sensor 7 (i.e., a measured value) (step 3).

In this case, whether the hydraulic shovel is functioning properly or not may be checked in the following manner: permissible ranges of items such as engine pressure oil, the quantity of remaining oil, and engine cooling water temperature measured by the aforesaid sensors 7 are set in advance. The malfunction detection means compares a measured value acquired by each sensor 7 during the operation of the hydraulic shovel and the permissible range set in advance. If the measured value acquired by each sensor 7 falls outside the permissible range, it determines that a malfunction has occurred in the hydraulic shovel (step 4).

This enables the malfunction detection means to detect different sorts of malfunctions of the hydraulic shovel such as a decrease in engine oil pressure, overheating of engine cooling water, an abnormal decrease in engine cooling water temperature, a decrease in the quantity of remaining fuel, a decrease in the quantity of hydraulic oil in an oil pressure circuit, and clog in a hydraulic oil filter.

If the malfunction detection means of the controller 6 detects a malfunction of the hydraulic shovel when an image captured by the camera 2 is displayed on the monitor screen 3, the warning display means of the controller 6 displays warning information 15 and 16 such that the warning information 15 and 16 is superposed, for example, on part of the upper left corner of the image displayed on the monitor screen 3 by the second display means, as shown in FIG. 4(*b*). Simultaneously, the warning display means generates a warning sound from the warning buzzer 5 (step 5).

In this case, the warning display means may display a caution icon 15 (i.e., an icon of an exclamation mark) indicating the occurrence of a malfunction of the hydraulic shovel and/or an icon 16 representing the cause of the malfunction.

Displaying warning icons on the part of the monitor screen 3 in this manner if a malfunction of the hydraulic shovel is detected makes it possible for the operator to become aware of the malfunction of the hydraulic shovel when the operator notices the warning information. In particular, in the present embodiment, warning information is displayed and, at the same time, a warning sound is generated from the warning buzzer 5, thus securely informing an operator of a malfunction occurred in the hydraulic shovel.

In the display device 1 according to the embodiment, an image on the camera 2 input by the second display means can be continuously displayed as it is on the monitor screen 3 even if a malfunction occurs in the hydraulic shovel. Thus, since the operator's checking safety through the monitor screen 3 during the operation of the hydraulic shovel is not hindered, the operator can stably continue work.

When the icon as a warning sign is displayed on the part of the monitor screen 3, the design, size, color, etc., of the icon may be changed according to the degree of malfunction occurred. Additionally, a displayed icon may be caused to blink. This makes it possible to securely give an operator accurate information about a malfunction of the hydraulic shove.

After the warning signs are displayed on the part of the monitor screen 3, the operation detecting means of the controller 6 checks whether the hydraulic shovel is working or not (step 6). In this case, based upon the degrees of lever operation of the work machine lever 8 and running lever 9 input to the controller 6, the operation detecting means determines whether the hydraulic shovel is working, moving in a particular direction, or stopped. Specifically, for example, the operation detecting means measures a predetermined lapse of time (ten seconds) after both the work machine lever 8 and running lever 9 are returned to their neutral positions, thereby determining that the hydraulic shovel has stopped working (step 7).

In response to detection made by the operation detecting means that the operation of the hydraulic shovel is stopped, the second switching means of the controller 6 automatically switches from image information input by the second display means, that is, an image captured by the camera 2 and displayed on the monitor screen 3, to image information input by the first display means (step 8). At this time, the monitor screen 3 on which the switching of the image information has taken place displays a variety of warning information (i.e., warning icons) 17, etc. according to the malfunction occurred. Thus, an operator is again made aware of the malfunction of the hydraulic shovel.

Thereafter, the operator can check a variety of information about the hydraulic shovel from the image information displayed on the monitor screen 3 input by the first display means. This makes it possible for the operator to specify the cause/causes of a malfunction of the hydraulic shovel and properly cope with the problem.

When moving the hydraulic shovel backward or moving the upper rotating body again, the operator depresses the first switching switch 4, thereby switching image information displayed on the monitor screen 3 to image information input by the second display means. Thus, an operator can smoothly operate the hydraulic shovel while checking the safety through an image captured by the camera 2 and displayed on the monitor screen 3.

The display device 1 according to this embodiment makes it possible to automatically switch image information on the monitor screen 3 after the detection of a malfunction in the hydraulic shovel and then the detection of the hydraulic shovel's having stopped working. This securely prevents an inconvenient situation where image information displayed on the monitor screen 3 is suddenly switched from an image captured by a camera to another image in course of the operation of the hydraulic shovel by the operator and without the operator's intention, as described in Patent Document 2.

Accordingly, without being hindered from checking the safety of the work of the hydraulic shovel, an operator can smoothly operate the hydraulic shovel while ensuring safety. In addition, the operator may unhurriedly ascertain the cause/causes of a malfunction of the hydraulic shovel after stopping the operation of the hydraulic shovel.

In the embodiment, a description was given of the case where image information input by the first and second display means is displayed on the monitor screen. However, the invention is not limited thereto but any other case such as where an operating image for operating the air conditioner of the operator's cab may be displayed on the monitor screen. The work mode, etc. of the hydraulic shovel can be altered by depressing the function keys, thereby switching to a setting image used for work mode alteration.

INDUSTRIAL APPLICABILITY

The display device according to the invention can be suitably used in any type of a hydraulic shovel equipped with a camera that monitors areas around the working vehicle.

The invention claimed is:

1. A display device mounted in a working vehicle equipped with a camera that monitors areas around the working vehicle, the display device comprising:
    a monitor screen;
    first display means for displaying on the monitor screen information describing work undertaken by the working vehicle or describing running status of the working vehicle;
    second display means for displaying on the monitor screen an image captured by the camera;
    first switching means for switching image information displayed on the monitor screen between image information input by the first display means and image information input by the second display means;
    malfunction detection means for detecting a malfunction occurred in the working vehicle;
    warning display means for displaying warning information on a part of the monitor screen;
    operation detecting means for detecting whether the working vehicle is working or not; and
    second switching means for automatically switching the image information displayed on the monitor screen from the image information input by the second display means to the image information input by the first display means; wherein
    when the image information input by the second display means is displayed on the monitor screen,
    if the malfunction detection means detects the malfunction in the working vehicle, the warning display means superposes and displays the warning information on the part of the monitor screen, and if the operation detecting means detects that the working vehicle has stopped working, the second switching means automatically switches the image information displayed on the monitor screen from the image information input by the second display means to the image information input by the first display means.

2. The display device according to claim 1, wherein the warning display means further comprises sound generating means for generating a warning sound.

3. A display method for a display device mounted in a working vehicle equipped with a camera that monitors areas around the working vehicle, the method comprising:
    providing a monitor screen;
    providing a first display means for displaying on the monitor screen information describing work undertaken by the working vehicle or describing running status of the working vehicle;
    providing a second display means for displaying on the monitor screen an image captured by the camera;
    providing a first switching means for switching image information displayed on the monitor screen between image information input by the first display means and image information input by the second display means;
    providing a malfunction detection means for detecting a malfunction occurred in the working vehicle;
    providing a warning display means for displaying warning information on a part of the monitor screen;
    providing an operation detecting means for detecting whether the working vehicle is working or not; and
    providing a second switching means for automatically switching the image information displayed on the monitor screen from the image information input by the second display means to the image information input by the first display means;
    detecting that the image information input by the second display means is displayed on the monitor screen,
    in response to determining that the malfunction detection means detects the malfunction in the working vehicle, superposing and displaying, by the warning display means, the warning information on the part of the monitor screen, and in response to determining that the operation detecting means detects that the working vehicle has stopped working, automatically switching, by the second switching means, the image information displayed on the monitor screen from the image information input by the second display means to the image information input by the first display means.

4. The display method according to claim 3, wherein a warning sound is generated in synchronization with displaying of the warning information on the part of the monitor screen.

* * * * *